United States Patent [19]

Smolnikov et al.

[11] 3,950,692

[45] Apr. 13, 1976

[54] METHOD AND DEVICE FOR D.C. VOLTAGE REGULATION ACROSS LOAD

[76] Inventors: Leonid Evgenievich Smolnikov, 1 Pryadilnaya ulitsa, 11, kv. 8; Nikolai Nikolaevich Laptev, Pervomaiskaya ulitsa, 64, kv. 50, both of Moscow, U.S.S.R.

[22] Filed: June 6, 1974

[21] Appl. No.: 477,066

[52] U.S. Cl. ............................... 321/27 R; 321/20
[51] Int. Cl.² ......................................... H02M 7/00
[58] Field of Search ............... 321/20, 27 R, 27 MS; 323/45

[56] References Cited
UNITED STATES PATENTS

| | | | |
|---|---|---|---|
| 3,010,062 | 11/1961 | Emden | 321/27 MS |
| 3,031,629 | 4/1962 | Kadri | 321/27 MS |
| 3,297,936 | 1/1967 | Ruch | 321/27 MS |
| 3,390,322 | 6/1968 | Rogers | 321/27 MS |
| 3,559,030 | 1/1971 | Bussard | 321/27 R X |
| 3,668,509 | 6/1972 | Riebs et al. | 321/27 R |

*Primary Examiner*—William M. Shoop
*Attorney, Agent, or Firm*—Haseltine, Lake & Waters

[57] ABSTRACT

The present invention relates to the field of electrical engineering and more particularly to a method of D.C. voltage regulation across a load and to a device to carry this method into effect. In a method of regulating D.C. voltage across a load with the aid of a plurality of transistor inverter circuits controlled by square-wave voltage and having transformer outputs, comprising at least one main transistor inverter circuit and a number of additional transistor inverter circuits, whereby the output voltages of said transistor circuits are summed with subsequent detection, in accordance with the invention, the sum component corresponding to the main transistor inverter circuit does not reverse its sign in the course of regulation, while the sign of the component corresponding to any one of the additional transistor inverter circuits is reversed following the reversal of the sign of the difference between the total value of quantities proportional to the output voltages of the main transistor inverter circuit and several other additional transistor inverter circuits, and the value proportional to the reference voltage determining voltage across the load, by alternating a train of alternate conduction and cut-off control signals, and a train of only cut-off control signals applied to the control junction of the transistors of any one said additional transistor inverter circuit.

7 Claims, 1 Drawing Figure

U.S. Patent April 13, 1976 3,950,692
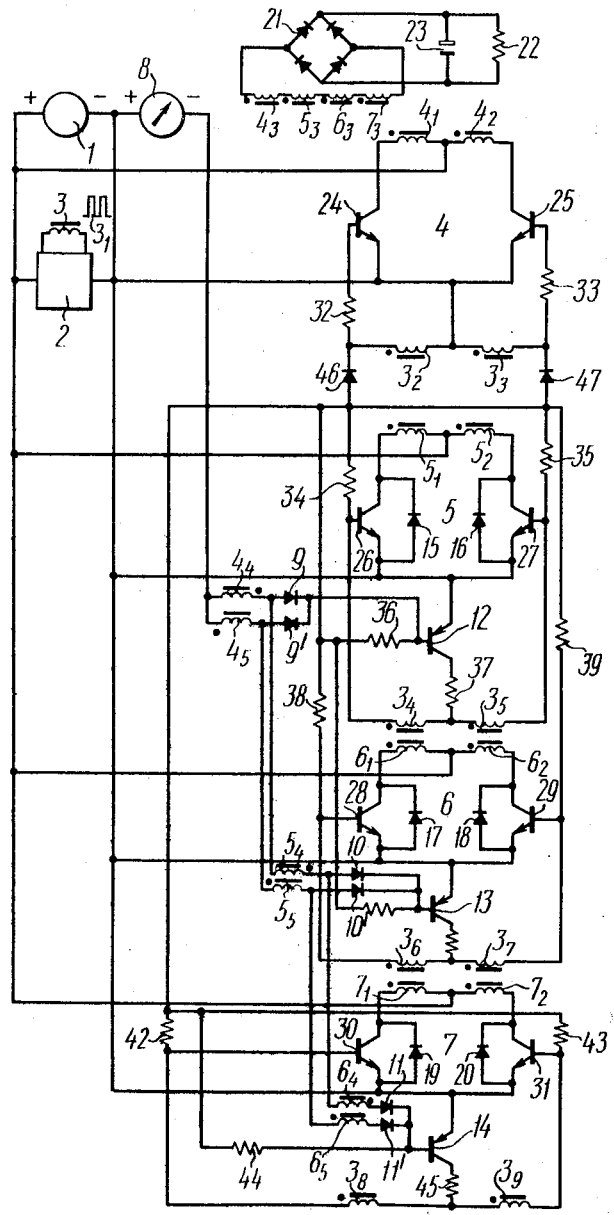

METHOD AND DEVICE FOR D.C. VOLTAGE REGULATION ACROSS LOAD

The present invention relates to the field of electrical engineering and more particularly to a method of regulating D.C. voltage across a load and a device to carry this method into effect.

A method and devices for regulating D.C. voltage are known which use at least one main and one additional inverter circuits with transformers the output windings of which are connected in series and to a load through a rectifier.

These known method and devices for D.C. voltage regulation depend on the principle of converting D.C. voltage into width-modulated alternating square pulses with their subsequent demodulation. The demodulator used is an L-C filter.

The use of an L-C filter increases the weight and the size of the entire device appreciably, and, besides, results in lower regulation speed and noticeable overvoltage peaks that may appear at the output.

It is an object of the present invention to provide a new method of controlling D.C. voltage across a load which makes redundant pulse-width modulation and subsequent demodulation by means of an L-C filter.

It is another object of the present invention to provide a device to realize this new method which would be more reliable and simple, have smaller dimensions and a higher speed of control.

With these objects in view, the invention resides in summing alternating square-wave voltages with subsequent detection and delivery to a load circuit and regulating D.C. voltage at the load by reversing the signs of the component voltages in the sum of square-wave voltages.

According to the present invention, there is provided a method of controlling D.C. voltage across a load with the aid of a plurality of transistor inverter circuits controlled by square-wave voltage and having transformer outputs, this plurality comprising at least one main trantransistor inverter circuits, whereby the output voltages of sistor inverter circuit and several additional said transistor circuits are summed and detacted, the sum component corresponding to the main transistor inverter circuit does not reverse its sign in the course of regulation, while the sign of the sum component corresponding to any one of the additional transistor inverter circuits is reversed following a reversal in the sign of the difference between the total value of quantities proportional to the output voltages of the main transistor inverter circuit and several other additional transistor inverter circuits, and the value proportional to a reference voltage which determines voltage across the load, by alternating a train of alternate conduction and cut-off control signals and a train of only cut-off control signals applied to the control junctions of transistors in any one of the additional transistor inverter circuits.

It is preferable that a device for regulating D.C. voltage across a load by way of the method disclosed herein, comprising a plurality of transistor inverter circuits controlled by square-wave voltage and having transformer outputs which are connected in series relation and to the load circuit through a rectifier and which are composed of at least one main transistor inverter circuit and other additional transistor inverter circuits, should include, in accordance with the invention, a logical unit with a reference voltage source and switching elements controlled by the logical unit and, in their turn, controlling the additional transistor inverter circuits, for which purpose each switching element has its input connected to one of the logical unit outputs and its output, to an appropriate transistor inverter circuit, the logical unit being designed so that the switching element of any one additional transistor inverter circuit closes at one definite value of the difference between the total value of the quantities proportional to the output voltages of the main transistor inverter circuit and several other additional transistor inverter circuits, and the value proportional to the reference source voltage, and opens when said difference reverses its sign.

It is also preferable that in a device to realize the present invention, a reference voltage source should be designed so as to permit voltage variations at its output terminals.

It is advisable that a device for regulating D.C. voltage across a load wherein the transformers of all the transistor inverter circuits have output windings connected in series and coupled to the load through a rectifier, and measuring windings, should have circuits of series-connected measuring windings of said transformers and a diode placed between the reference voltage source and each output of the logical unit. Another embodiment of the device for regulating D.C. voltage across a load comprises three additional transistor inverter circuits, wherein in the logical unit the measuring winding of the transformer of the main transistor inverter circuit connected in series relation with a diode is provided between a reference voltage source and a first output of the logical unit corresponding to the switching element of a first additional transistor inverter circuit, series-connected measuring windings of the transformers of the main and the first additional transistor inverter circuits and another diode are provided between the reference voltage source and a second output of the logical unit corresponding to the switching element of a second additional transistor inverter circuit, and series-connected measuring windings of the transformers of the main, and also the first and the second additional transistor inverter circuits and a third diode are provided between the reference voltage source and a third output of the logical unit corresponding to the switching element of a third additional transistor inverter circuit.

The devices carrying into effect the present invention are simple to manufacture, reliable in operation, have a high speed of regulation and are widely applicable for control and stabilization of D.C. voltage in various electronic equipments, in the first place, those built around semiconductor elements.

The invention will be more clearly understood from the following detailed description of a preferred embodiment thereof when read with reference to the accompanying drawing which is a circuit diagram of a preferred embodiment of a device for regulating D.C. voltage across a load.

A device for regulating D.C. voltage across a load disclosed herein is supplied from a supply source I and comprises a master oscillator 2 with a transformer 3, a main transistor inverter circuit 4 and auxiliary transistor inverter circuits 5, 6 and 7, a first, a second, and a third circuit respectively. All the transistor inverter circuits have transformers.

A transformer of the main transistor inverter circuit 4 has primary windings $4_1$ and $4_2$, an output winding $4_3$, and measuring windings $4_4$ and $4_5$.

A transformer of the first additional transistor inverter circuit 5 has primary windings $5_1$ and $5_2$, an output winding $5_3$, and measuring windings $5_4$ and $5_5$.

A transformer of the second additional transistor inverter circuit 6 has primary windings $6_1$, $6_2$, an output winding $6_3$, and measuring windings $6_4$ and $6_5$. A transformer of the third additional transistor inverter circuit 7 has three windings: two primary windings $7_1$ and $7_2$, and an output winding $7_3$. The master oscillator 2 generates square-wave voltage in the form of alternating square pulses which control the transistor inverter circuits 4, 5, 6 and 7. The transformer 3 of the master oscillator 2 has nine windings: a primary winding $3_1$ and eight secondary windings $3_2$–$3_9$.

The device of the invention also includes a reference voltage source 8, diodes 9, 9'; 10, 10', and 11, 11', switching elements 12, 13, 14 of the first additional transistor inverter circuit 5, of the second circuit 6, and of the third circuit 7, respectively. In a preferred embodiment of the device, the switching elements are transistors which in further text will be called control transistors 12, 13 and 14, respectively.

The drawing also shows back diodes 15, 16, 17, 18, 19 and 20, a rectifier 21, a load 22, a capacitor 23, transistors 24, 25, 26, 27, 28, 29, 30 and 31, resistors 32, 33, 34, 35, 36, 37, 38, 39, 40, 41, 42, 43, 44, 45, and diodes 46 and 47.

The reference voltage source 8; the measuring windings $4_4$ and $4_5$ of the main transistor inverter circuit 4; the measuring windings $5_4$ and $5_5$ of the first additional transistor inverter circuit 5; the measuring windings $6_4$ and $6_5$ of the second additional transistor inverter circuit 6; and also the diodes 9 and 9', 10 and 10', and 11 and 11' make up a logical unit.

In the logical unit, the measuring winding $4_4$ of the transformer of the main transistor inverter circuit 4 connected in series with the diode 9 (and also the measuring winding $4_5$ of the main transistor inverter circuit 4 connected in series with the diode 9' to achieve full-wave rectification) are provided between the reference voltage source 8 and the first output of the logical unit corresponding to the control transistor 12 (switching element) of the first additional transistor inverter circuit 5; the measuring winding $4_4$ of the transformer of the main transistor inverter circuit 4 connected in series with the measuring winding $5_4$ of the transformer of the first additional transistor inverter circuit 5 and the diode 10 (and also the measuring winding $4_5$ of the transformer of the main transistor inverter circuit 4 connected in series with the measuring winding $5_5$ of the transformer of the first additional transistor inverter circuit 5 and the diode 10 to achieve full-wave rectification) are provided between the reference voltage source 8 and the second output of the logical unit corresponding to the control transistor 13 (switching element) of the second additional transistor inverter circuit 6; and the measuring winding $4_4$ of the transformer of the main transistor inverter circuit 4 connected in series with the measuring wiring $5_4$ of the transformer of the first additional transistor inverter circuit 5, the measuring winding $6_4$ of the transformer of the second additional transistor inverter circuit 6 and the diode II (and also the measuring winding $4_5$ of the transformer of the main transistor inverter circuit 4 connected in series with the measuring winding $5_5$ of the transformer of the first additional transistor inverter circuit 4, the measuring winding $6_5$ of the transformer of the second additional transistor inverter circuit 6, and the diode II' to achieve full-wave rectification) are provided between the reference voltage source 8 and the third output of the logical unit corresponding to the control transistor 14 (switching element) of the third additional transistor inverter circuit 7.

The diodes 46 and 47 serve to bias the transistors 26–31 of the additional inverter circuits 5, 6 and 7 beyond the cut-off level, with the control transistor 12, 13 and 14, respectively, in a non-conducting state.

For normal operation of the device, the absolute value of the output voltage of the main transistor inverter circuit must be larger than the output voltage of any additional transistor inverter circuit.

Assuming for the sake of simplicity, that all the elements of the circuitry have ideal characteristics, consider operation of the circuitry when regulating the output voltage of a prefered embodiment of the device at certain relative level 1.00 with the supply voltage varying within 0.80–1.20, for instance, for the following relation of the transformation ratios of the main and additional inverter circuits:

$K_O$: $K_1$: $K_2$: $K_3$ = 1:0.143:0.071:0.036 /K is the ratio of the number of turns in the output winding of the transformer of a circuit to the number of turns in its primary winding.

Under the assumptions made the regulation process has characteristics shown in the table below:

| Supply voltage | Output voltage of main inverter circuit | Output voltages of additional inverter circuits | | | Output converter voltages | Relative stability of converter output voltage,% |
|---|---|---|---|---|---|---|
| | | first | second | third | | |
| 0.800 | +0.800 | +0.115 | +0.057 | +0.029 | 1.002 | +0.2 |
| 0.850 | +0.850 | +0.122 | +0.060 | −0.031 | 1.001 | +0.1 |
| 0.900 | +0.900 | +0.129 | −0.064 | +0.032 | 0.997 | −0.3 |
| 0.950 | +0.950 | +0.136 | −0.068 | −0.034 | 0.984 | −1.6 |
| 1.000 | +1.000 | +0.143 | −0.071 | −0.036 | 1.036 | +3.6 |
| 1.050 | +1.050 | −0.150 | +0.075 | +0.038 | 1.013 | +1.3 |
| 1.100 | +1.100 | −0.158 | +0.078 | −0.040 | 0.980 | −2.0 |
| 1.150 | +1.150 | −0.165 | −0.082 | −0.042 | 1.025 | +2.5 |
| 1.200 | +1.200 | −0.172 | −0.085 | +0.043 | 0.986 | −1.4 |

Regardless of the voltage output of the supply source 1, the master oscillator 2 with the transformer 3 (primary winding $3_1$, secondary windings $3_2$–$3_9$) connected to the source 1 generates symmetrical alternating square pulses to be used for controlling both the main inverter circuit 4 and the additional inverter circuits 5–7.

At a minimum supply voltage equal to 0.80 in relative units, the total voltages of the reference source 8 and corresponding measuring windings $4_4, 4_5, 5_4, 5_5$ and $6_4, 6_5$ are such that back voltages are applied to the diodes 9, 9', 10, 10' and 11, 11', the diodes are cut off and, consequently, currents from the windings $3_2$ and $3_3$ of the master oscillator and from the windings $3_4 - 3_9$ of the master oscillator are delivered, respectively, to the bases of the control transistors 12–14 and to the bases of the switching transistors of all the additional inverter circuits so that the voltage outputs of these circuits vary in phase with the voltage output of the main circuit. No current flows through any of the back diodes 15–20 and the output voltage of the converter is the arithmetic sum of the voltage outputs of all the inverter circuits.

If the voltage supply level is 0.85, the states of the diodes 9, 9', 10, 10' and, consequently, those of the additional inverter circuits 5, 6 remain unchanged, whereas currents passing alternately through the diodes 11, 11' drive the control transistor 14 and the switching transistors of the additional transistor inverter circuit 7 into a cut-off state, and the inverter circuit starts acting as a rectifier to recuperate power from the external circuit through the back diodes 19.20 into the power supply source.

In this case, the output voltage of the circuit varies out of phase with the output voltages of the remaining circuits and, consequently, is subtracted from the sum of these voltages (see the table).

With a further increase of the supply voltage, depending on the states of the diodes 9, 9', 10, 10', 11 and 11' each of the additional inverter circuits may produce a positive or a negative component of the output voltage of the preferred embodiment, the sign of the component being automatically determined by the relation between the reference source voltage and the sum of the voltages of the corresponding measuring windings, so that the output voltage of the device of the invention is maintained stable within preset limits.

The table above shows that at selected transformation ratios relative stability of the converter output voltage is not worse than ±3.6% in a preset supply voltage range.

As the rise time of square-wave voltage pulses at the circuit transformer windings in other than zero, the switching capacitor 23 of rather low capacitance is coupled to the load 22 connected via the rectifier 21 with a view to avoiding voltage surges as the circuits are turned on or off.

It is obvious that due to a filter being practically absent and to a small total power of the additional inverter circuits (in our example it is approximately 20% of the total power of the device), the circuitry operates at a high efficiency close to the efficiency of a non-stabilized device for controlling D.C. voltage across a load.

Various embodiments of the device can be provided. Thus, the reference voltage source 8 may be a Zener diode fed through an auxiliary resistor and an auxiliary fullwave rectifier from the additional windings of the master oscillator transformer or the transformer in the main inverter circuit.

The master oscillator can be connected through its supply circuit to the windings of the main inverter circuit transformer or to the output of the device for D.C. voltage regulation. The main inverter circuit operating in a continuous generation mode makes redundant the use of a master oscillator, therefore, the transistors of the additional inverter circuits may be controlled directly from the winding of the main circuit transformer.

To ensure reliable operation of the switching transistors as gates, it is advisable that composite transistors, relay elements of the Schmitt trigger type, etc. be used as switching elements in the input circuits of the additional inverter circuits.

For raising the stability of the output voltage, another additional low-power inverter circuit may be connected in series with the load, with the output winding of its transformer connected in series with the output windings of the transformers of all other circuits, so that the operation of the inverter circuit is directly affected by the voltage difference across the load and at a certain additional reference voltage source. If the supply voltage of such a circuit is continuously variable under the effect of variations in said voltage difference, the inverter circuit provides automatically additional continuous regulation of D.C. output voltage at a preset stabilization level.

One of the most important applications of the device of this invention may be its use for producing regulated D.C. voltage from non-regulated commercial-frequency three-phase mains.

In this case, as follows from the above described operating principle of the device, the supply source 1 may be three-phase mains with a bridge rectifier connected to its output without any additional filter necessary.

Due to common electrodes of the transistors, the regulator can be easily minituarized by employing an integrated control circuit.

For regulating the output voltage of the device, it is required to vary voltage at the reference voltage source 8.

What is claimed is:

1. A method of regulating D.C. voltage across a load with the aid of a plurality of transistor inverter circuits controlled by square-wave voltage and having transformer outputs, said plurality comprising at least one main transistor inverter circuit and several additional transistor inverter circuits, whereby a reference voltage determining voltage across the load is set, then the output voltages of said transistor inverter circuits are summed and detected, so that the component of the sum corresponding to said main transistor inverter circuit does not reverse its sign in the course of regulation, while the sign of the sum component corresponding to any one of said additional transistor inverter circuits is reversed following a reversal of the sign of the difference between the total value of quantities proportional to the output voltages of said main transistor inverter circuit and several other additional transistor inverter circuits, and the value proportional to said reference voltage by alternating a train of alternate conduction and cut-off control signals and a train of only cut-off control signals applied to the control junctions of the transistors in any one of said additional transistor inverter circuits.

2. A device for regulating D.C. voltage across a load, comprising: a plurality of transistor inverter circuits with transformer outputs; said plurality of inverter circuits of which at least one is a main inverter circuit and others are additional circuits; said transistor inverter circuits controlled by square-wave voltage; a rectifier; said transistor inverter circuits with their outputs connected in series configuration and coupled to the load via said rectifier; a logical unit with a reference voltage source; said reference voltage source which determines voltage across the load; said logical unit having outputs the number of which is equal to the number of said additional transistor inverter circuits; switching elements the number of which is equal to the number of said additional transistor inverter circuits; each said additional transistor inverter circuit comprising in its transistor control circuit one of said switching elements with the input thereof connected with one output of said logical unit; said switching element of one of said additional transistor inverter circuits is closed by a signal generated by said logical unit at a certain sign of the difference between the total value of the quantities proportional to the output voltages of said main transistor inverter circuit and several other additional transistor inverter circuits, and the value proportional to the voltage of said reference voltage source, and is opened when said difference reverses its sign.

3. A device as defined in claim 2 for regulating D.C. voltage across a load in which a reference voltage source is designed such that voltage at its output terminals can be varied.

4. A device as defined in claim 2 for regulating D.C. voltage across a load in which the transformers of all transistor inverter circuits have output windings connected in series configuration and coupled through a rectifier to the load, and measuring windings, while circuits of series-placed measuring windings of said transformers and a diode are connected between the reference voltage source and each output of the logical unit.

5. A device as defined in claim 3 for regulating D.C. voltage across a load in which the transformers of all transistor inverter circuits have output windings connected in series configuration and coupled through a rectifier to the load, and measuring windings, while circuits of series-placed measuring windings of said transformers and a diode are connected between the reference voltage source and each output of the logical unit.

6. A device as defined in claim 4 for regulating D.C. voltage across a load, comprising three additional transistor inverter circuits, wherein the logical unit is so designed that the measuring winding of the transformer of the main transistor inverter circuit connected in series configuration with a diode is provided between a reference voltage source and a first output of the logical unit corresponding to the switching element of a first additional transistor inverter circuit, series-connected measuring windings of transformers of the main and the first additional transistor inverter circuits and another diode are provided between the reference voltage source and a second output of the logical unit corresponding to the switching element of a second additional transistor inverter circuit, and series-connected measuring windings of the transformers of the main inverter circuit, and also the first and the second additional transistor inverter circuits and a third diode are provided between the reference voltage source and a third output of the logical unit corresponding to the switching element of a third additional transistor inverter circuit.

7. A device as defined in claim 5 for regulating D.C. voltage across a load comprising three additional transistor inverter circuits, wherein the logical unit is so designed that the measuring winding of a transformer of a main transistor inverter circuit connected in series configuration with a diode is provided between a reference voltage source and a first output of the logical unit corresponding to the switching element of a first additional transistor inverter circuit, series-connected measuring windings of transformers of the main and the first additional transistor inverter circuits and another diode are provided between the reference voltage source and a second output of the logical unit corresponding to the switching element of a second additional transistor inverter circuit, and series-connected measuring windings of transformers of the main inverter circuit, and also the first and the second additional transistor inverter circuits and a third diode are provided between the reference voltage source and a third output of the logical unit corresponding to the switching element of a third additional transistor inverter circuit.

* * * * *